(12) United States Patent
Hairston

(10) Patent No.: US 6,721,959 B1
(45) Date of Patent: Apr. 20, 2004

(54) SET OF PROTECTIVE SLEEVES FOR CANINE TRAINING

(75) Inventor: Guy Edward Hairston, Shelbyville, TN (US)

(73) Assignee: Guy E. Hairston, III, Goodlettsville, TN (US)

( * ) Notice: Subject to any disclaimer, the term of this patent is extended or adjusted under 35 U.S.C. 154(b) by 0 days.

(21) Appl. No.: 10/302,708

(22) Filed: Nov. 25, 2002

(51) Int. Cl.[7] .............................................. A41D 13/08
(52) U.S. Cl. ............................................................ 2/16
(58) Field of Search ........................... 2/16, 46, 20–22, 2/159, 160, 161.1, 162, 59, 125, 17; 128/877, 878, 879; 602/20, 21, 22

(56) References Cited

U.S. PATENT DOCUMENTS 3,902,196 A * 9/1975 Reinfandt ........................ 2/2.5
4,361,912 A * 12/1982 Arthur ............................. 2/18
5,911,197 A * 6/1999 Schmid ....................... 119/712
5,953,752 A * 9/1999 Jones ............................... 2/16

* cited by examiner

Primary Examiner—Tejash Patel

(57) ABSTRACT

A set of protective sleeves comprising two or more protective sleeves for training dogs for military law enforcement, security, protection and sport purposes, comprising sleeves with similar construction and appearance; each sleeve offering a different level of resistance to compression. The sleeves have one-piece handles that are contoured to fit the trainer's hand and can be mounted in a plurality of different orientations and locations. The sleeves have one-piece end caps with ledges for attachment to the sleeve and holes to provide ventilation. Different variations of leaf springs can be used in each sleeve to set the level of resistance to compression of the sleeve. Each sleeve in the set cannot be visually distinguished from the other sleeves by the dog in advance of the training, and each sleeve has similar construction so that it is necessary for the trainer to become adept at handling only one type of sleeve.

5 Claims, 8 Drawing Sheets

SET OF PROTECTIVE SLEEVES FOR CANINE TRAINING

CROSS-REFERENCE TO RELATED APPLICATION

Not Applicable.

STATEMENT REGARDING FEDERALLY SPONSORED RESEARCH OF DEVELOPMENT

Not Applicable.

REFERENCE TO A MICROFICHE APPENDIX

Not Applicable.

BACKGROUND OF THE INVENTION

1. Field of the Invention

The present invention relates generally to the art of using a protective sleeve on one arm to train dogs for military, law enforcement, security, protection and sport purposes, and more particularly to a set of protective sleeves for use in training dogs for the purpose of promoting the dog's athletic ability and helping the dog develop a firm, full-grip bite.

2. Description of the Prior Art

One method for training dogs for military, law-enforcement, security, protection and sport purposes is to teach the dog to bite by using a protective sleeve. The protective sleeve is generally comprised of a lower forearm section covering the wearer's forearm, hinged near the elbow area to an upper section covering the wearer's upper arm. In actual use, a removable padded cuff encases the lower section, the elbow, and a portion of the upper section. The trainer wears the protective sleeve on one arm and attempts to provoke the dog to encourage the dog to bite the sleeve.

It is customary for young dogs or dogs with no prior bite-training to begin their training by using sleeves that are relatively easy for the dog to compress with its mouth, without the dog having to exert a lot of force with the bite. As the dog's training progresses, it is desirable to continue the dog's training with a sleeve that requires the dog to use more force in the bite to compress the sleeve. The age, maturity and development of the individual dog determine the appropriate sleeve type and the sleeve with the appropriate level of resistance to compression to be used for training.

As the dog's age, maturity and skills increase, it is desirable to continue the dog's training using sleeves that require increasing levels of force to be exerted by the dog's bite in order to compress the sleeve. This manner of training, similar to all types of athletic and weight training, helps develop the full athletic ability and bite strength of the dog.

Heretofore, the sleeves used for training puppies and young dogs to bite were relatively easy for the dog to bite and compress. As the dog's skill increased, the trainer would begin using sleeves that would require the dog to exert more force with the bite in order to compress the sleeve. These sleeves which offered increased resistance to compression were heavier and different in appearance from the sleeves which offered less resistance to compression. After several training sessions with different types of sleeves, the dog would typically learn to visually distinguish the type of sleeve being used. This had the undesirable effect that the dog would visually recognize a "soft" or "hard" sleeve and anticipate the feel of the bite surface in advance.

Another disadvantage of using different types of sleeves in order to increase the force of the dog's bite is that the various types of sleeves were constructed differently and ranged in weight from light to heavy. The heavier-weight sleeves were in part a result of attempting to increase the resistance of the sleeve by adding extra materials to the sleeve to increase the rigidity. Various constructions resulted in bulky sleeves which were difficult to handle with precise, fluid motions. Thus, the trainer had to develop training skills and become proficient at using numerous different types of sleeves; the different constructions caused each type of sleeve to move differently, requiring the trainer to develop distinct skills and muscle movements to control and properly present each different sleeve to the dog. Additionally, the heavier sleeves usually increased fatigue for the trainer.

Another disadvantage of the prior art sleeves is that it has been common for the part of the sleeve covering the forearm of the trainer to fatigue to the repeated compression of the sleeve from dog bites.

During training, the trainer supports and controls the sleeve by grasping a handle mounted inside the lower section of the sleeve. Sleeves of the prior art typically had handles made of hard, straight material such that the handle was not comfortable to grip. The handle designs were typically bulky in construction and materials and contributed to the overall weight of the protective sleeve.

U.S. Pat. No. 5,911,197, issued to Schmid, is directed to a sleeve that is shaped to correspond to the shape of the trainer's forearm and hand. A bite bar is secured to an exterior surface of the sleeve and has a substantially wedge-shaped cross section. A cover is arranged over the sleeve and the bite bar for grasping by the dog. The bite bar is adjustable on the sleeve to achieve different presentation angles for different wearers. The training device provides improved comfort and improved responsiveness due to the contoured shape of the training device sleeve.

U.S. Pat. No. 3,902,196 issued to Reinfandt is directed to a protective sleeve to be worn by the trainer comprising a plurality of layers of ballistic type nylon and nylon mesh material respectively to provide protection from canine tooth penetration and consequent injury to the trainer. Adjustable single-handed fastener means are also provided to facilitate mounting of the apparatus on the wearer's arm. The sleeve does not have a hinge at the elbow area, but is formed in one piece so as to extend from slightly above the wrist to the armpit.

While the patents referenced hereinabove generally disclose protective sleeves for canine training, each discloses a particular construction of sleeves to be used for a particular type and level of training; none discloses a set of sleeves to be used for training a dog at all levels. Accordingly, it has been deemed desirable to develop a set of sleeves such that each sleeve offers a different level of resistance to compression, to be used depending on the level of the dog's training and the dog's ability to bite; each sleeve is similar in appearance so the dog will be unaware of the type of sleeve being used, and unable to anticipate the "feel" of the bite surface or the amount of force necessary to compress the sleeve; each sleeve is similar in construction and weight such that the trainer using the sleeve is required to develop proficiency at using one type and weight sleeve instead of many; and such that the sleeve forearm of each sleeve is reinforced at the elbow area to prevent frequent breakdown at the hinge area. As such, it may be appreciated that there continues to be a need for a new and improved set of protective sleeves as set forth by the present invention.

BRIEF SUMMARY OF THE INVENTION

In view of the foregoing disadvantages inherent in the known types of protective sleeves now present in the prior art, it is an object of the present invention to provide a set of protective sleeves to be used for training dogs at all levels of ability, maturity and age for military, law enforcement, security, protection and sporting purposes as described in the following specifications.

In training dogs for military, law enforcement, security, protection and sporting purposes, a protective sleeve is worn on either the right or left arm of the trainer to help reduce the risk of injury to the trainer while teaching the dog to bite the sleeve. The protective sleeve comprises a lower sleeve that covers the forearm of the trainer, attached by means of a hinge to an upper sleeve that covers the upper arm of the trainer. The protective sleeve assembly is encased with a protective cover during use.

During canine training, the trainer inserts his or her arm inside the protective sleeve and supports and controls the sleeve by grasping a handle that is secured inside the lower sleeve. The handle according to the present invention is a one-piece molded design that is light weight, is contoured to fit the shape of the trainer's hand, and has extensions at each end for attaching said handle to the inside of the lower sleeve section.

An end cap covers the opening at the end of the lower sleeve. The end cap according to the present invention is a one-piece molded design that is light weight, has holes to provide ventilation in the sleeve, and provides reinforcement to improve durability of the sleeve by helping maintain the shape of the lower sleeve over time.

A distinct feature of the present invention is the leaf spring that adds reinforcement to the lower sleeve, requiring the dog to exert more force when biting the sleeve. The amount of force necessary for the dog to exert in order to compress the lower sleeve is controlled by varying the leaf spring properties, such as the shape, size, material, thickness, location and other properties.

The leaf spring enables a trainer to use a number of different protective sleeves of the present invention, with each having a different leaf spring and thus each requiring a different force from the dog to compress the sleeve while maintaining the similar appearance and construction of each sleeve. The dog cannot visually distinguish the different protective sleeves and therefore cannot anticipate the "feel" of the bite and will not develop the unfavorable habit of always exerting the same amount of force. The leaf spring also provides reinforcement to help maintain the shape of the lower sleeve over time.

These and other objects, features and advantages shall become apparent after consideration of the description and drawings set forth herein. All such objects, features and advantages are contemplated to be within the scope of the present invention even though not specifically set forth herein.

BRIEF DESCRIPTION OF THE SEVERAL VIEWS OF THE DRAWING

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
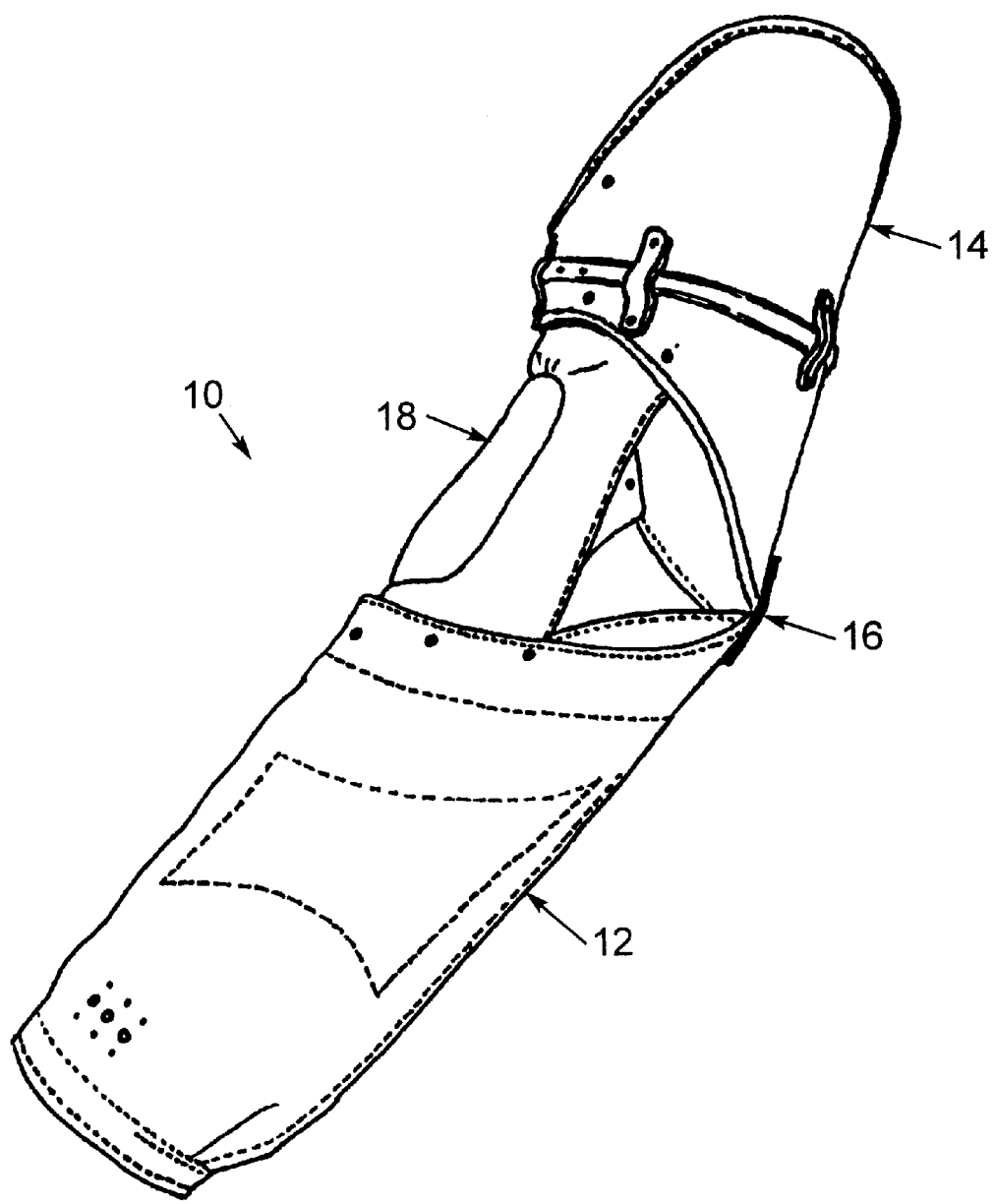
FIG. 1 is a side view of the protective sleeve according to the present invention.
Figure 4:
FIG. 4. is an illustration of a dog being trained by a trainer wearing the training sleeve of the present invention.
Figure 5:
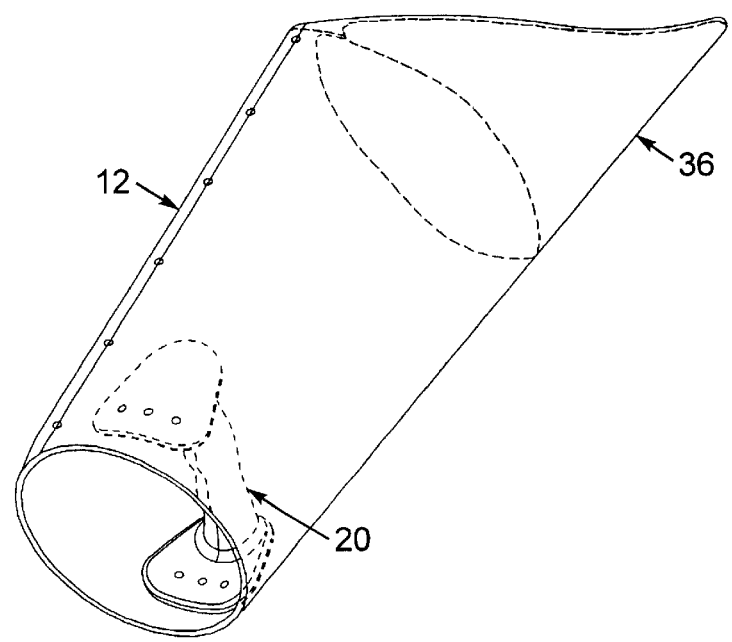
FIG. 5. is a perspective view of the protective sleeve, showing an example of the general shape and location of the spring according to the present invention.
Figure 6:
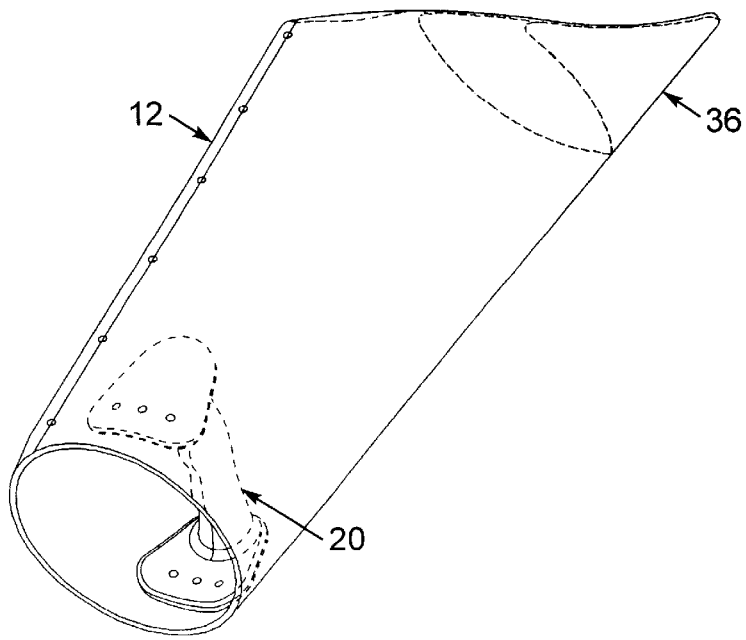
FIG. 6. is a perspective view of the protective sleeve, showing another example of the general shape and location of the spring according to the present invention.
Figure 7:
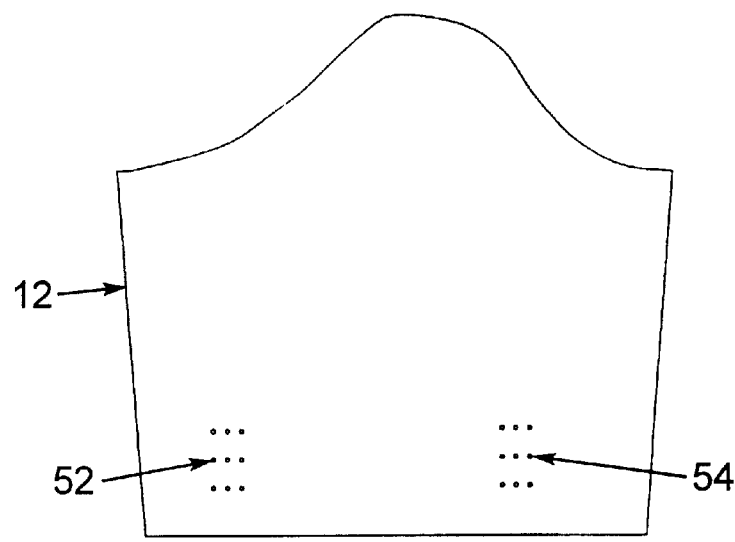
FIG. 7. is a top view of the lower sleeve in a relatively flat position prior to assembly.
Figure 8:
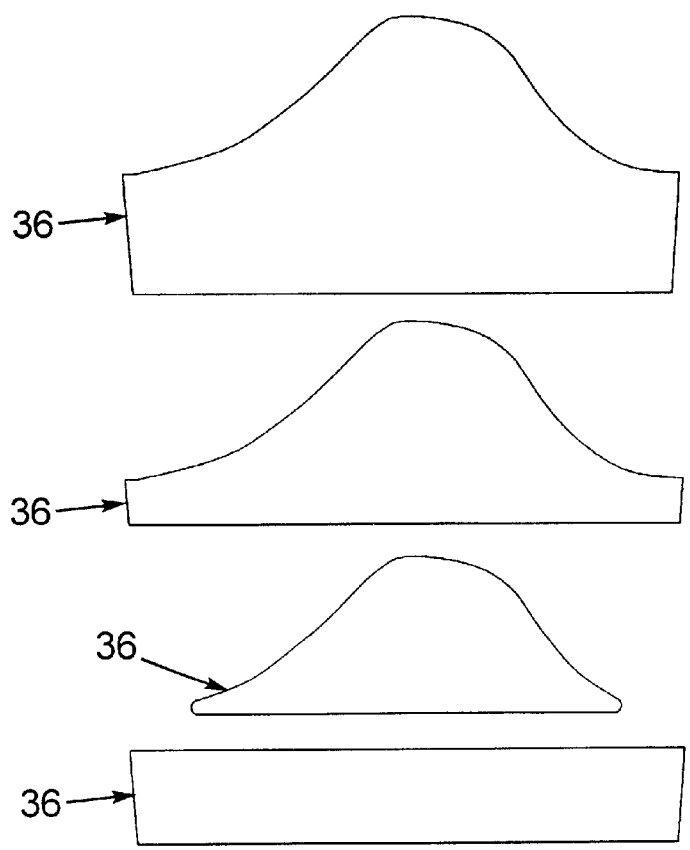
FIG. 8. is a top view of several possible variations of the leaf spring of the present invention, each in a relatively flat position prior to assembly into the protective sleeve.
Figure 9:
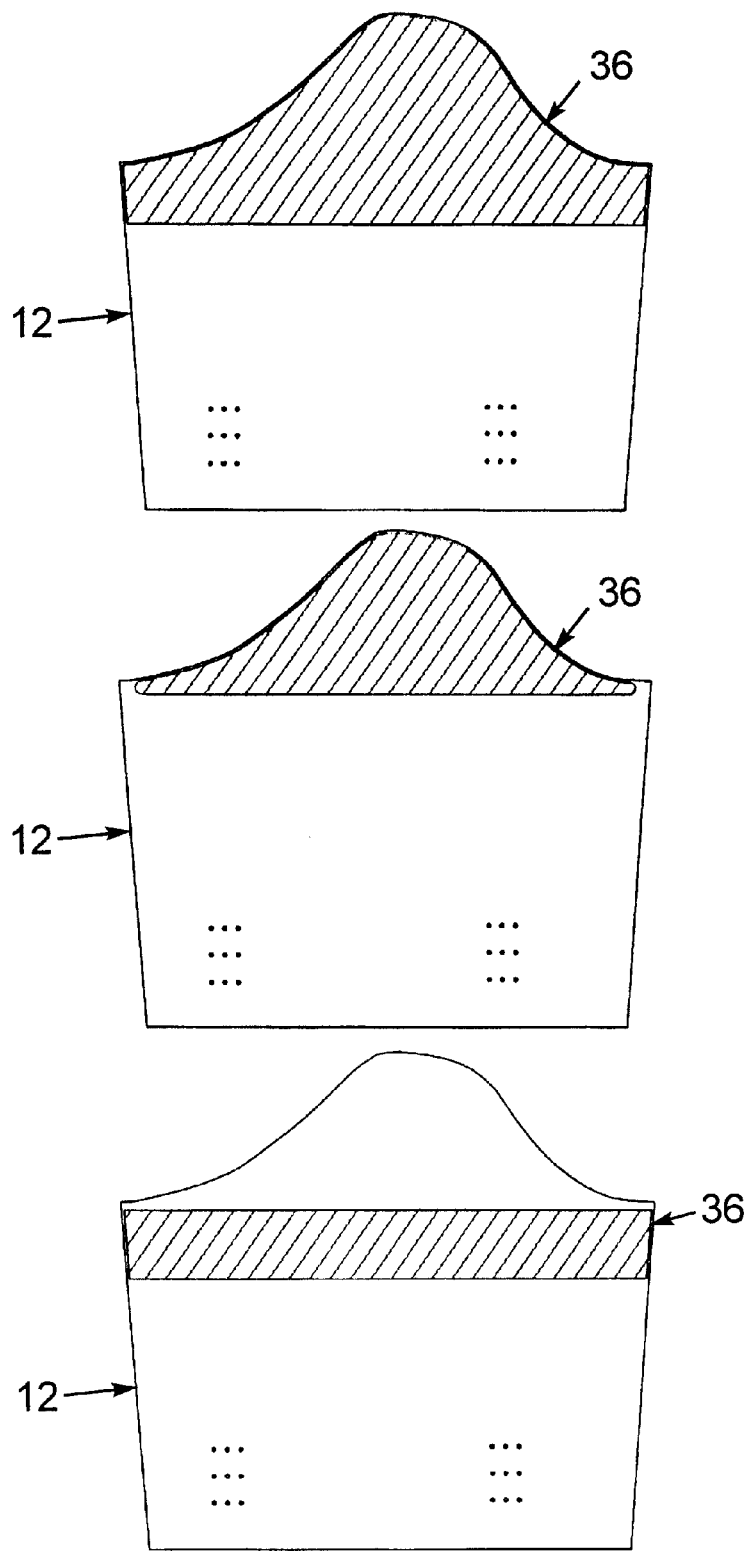
FIG. 9. is a top view of several lower sleeve and leaf spring assemblies, each shown in a relatively flat position prior to assembly into the protective sleeve and having a different variation of the leaf spring of the present invention.

In training dogs for military, law enforcement, security, protection and sporting purposes, a protective sleeve is worn on either the right or left arm of the trainer, as illustrated in FIG. 4. The protective sleeve is used to help reduce the risk of injury to the trainer while teaching the dog to bite the sleeve. The protective sleeve according to the present invention is designated generally by reference numeral 10 in FIG. 1.

Protective Sleeve 10 comprises a lower sleeve 12 that covers the forearm of the trainer and an upper sleeve 14 that covers the upper arm of the trainer. The lower sleeve 12 may be formed of one or more layers of plastic or other material, and may be bound together with one or more layers of other materials, fabrics, leather or the like by means of stitching and a binding around the perimeter. The lower sleeve 12 has two opposite sides 40 and 42 in FIG. 2 that are straight and are designed to be overlapped and fastened together such that the lower sleeve 12 forms a cylindrical shape to fit over the trainer's forearm. The two straight sides are not parallel so that the proximal end 44 of the lower sleeve 12 has a larger diameter for the elbow area, and the distal end 46 of the lower sleeve 12 has a smaller diameter for the wrist and hand.

Similarly, the upper sleeve 14 may be formed of one or more layers of plastic or other material, and may be bound together with one or more layers of other materials, fabrics, leather or the like by means of stitching and a binding around the perimeter. The upper sleeve 14 has two opposite sides that are designed to be overlapped and fastened together such that the upper sleeve 14 forms a cylindrical shape to fit over the trainer's upper arm. The shape of the upper sleeve 14 is designed to cover a portion of the trainer's upper arm down to the elbow, to provide protection from the dog bite without interfering with the lower sleeve 12 when the sleeve is moved during training.

Figure 3:
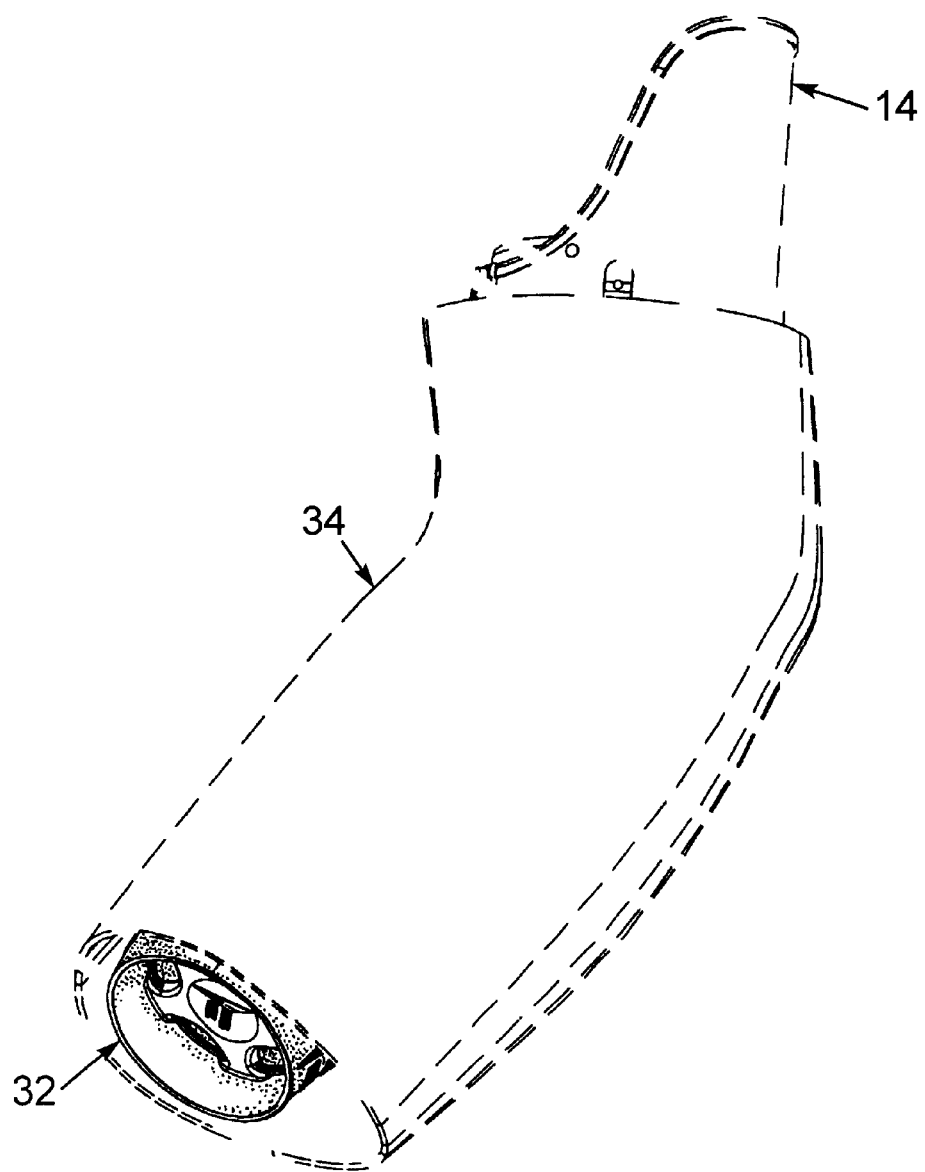
FIG. 3. is a perspective view of the protective sleeve according to the present invention, shown with the protective cover installed over said protective sleeve.

The lower sleeve 12 and upper sleeve 14 are connected at the elbow area with a hinge 16. The open area between the lower sleeve 12 and upper sleeve 14 opposite the hinge 16 is covered with a bicep cover 18 made from a material such as suede, leather, fabric or the like. During actual training, the protective sleeve 10 is covered with a protective cover 34 depicted in FIG. 3 typically made from a quilted, woven material such as jute.

During canine training, the trainer inserts his or her arm inside the protective sleeve 10 and supports and controls the sleeve by grasping a handle 20, illustrated in FIGS. 2, 3, 5, and 6, mounted inside the distal end of the lower sleeve 12. The handle 20 according to the present invention is a one-piece molded design that is made of a light weight material such as plastic, is contoured to fit the shape of the trainer's hand, and has extensions 48 and 50 at each end for attaching said handle 20 to the inside of the lower sleeve 12 through one or more mounting holes located on each extension 48 and 50. The mounting holes on the extensions 48 and 50 are secured to corresponding sets of mounting holes 52 and 54 on the lower sleeve 12. The lower sleeve has one or more sets of mounting holes 52 and 54 at different locations on the lower sleeve 12, to allow the handle 20 to be secured at various different angles, orientations and locations within the lower sleeve 12 so that the protective sleeve 10 can be manufactured to comfortably fit the arms of different trainers.

Figure 2:
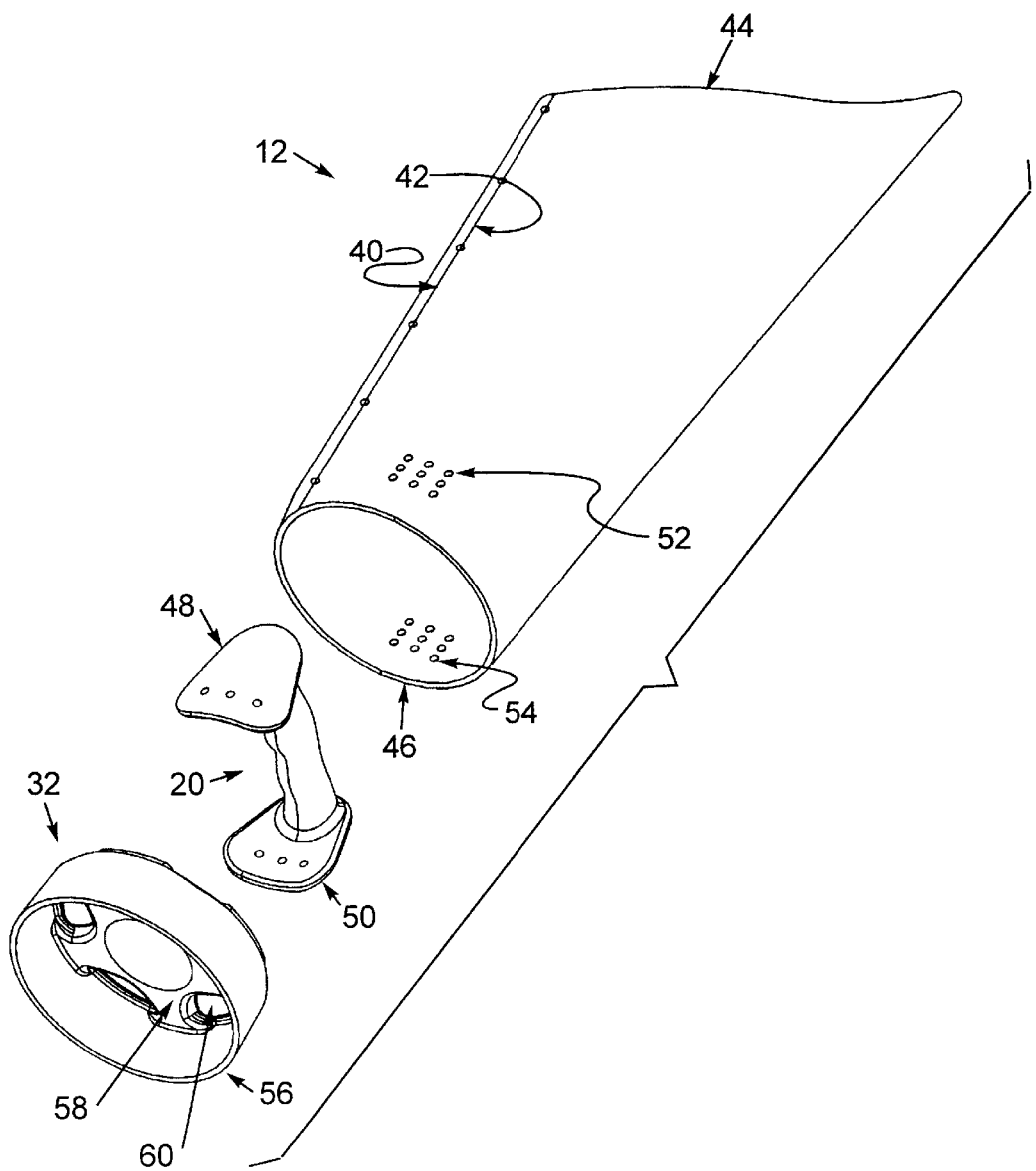
FIG. 2 is an exploded perspective view of the lower forearm section of the protective sleeve according to the present invention.
Figure 10:
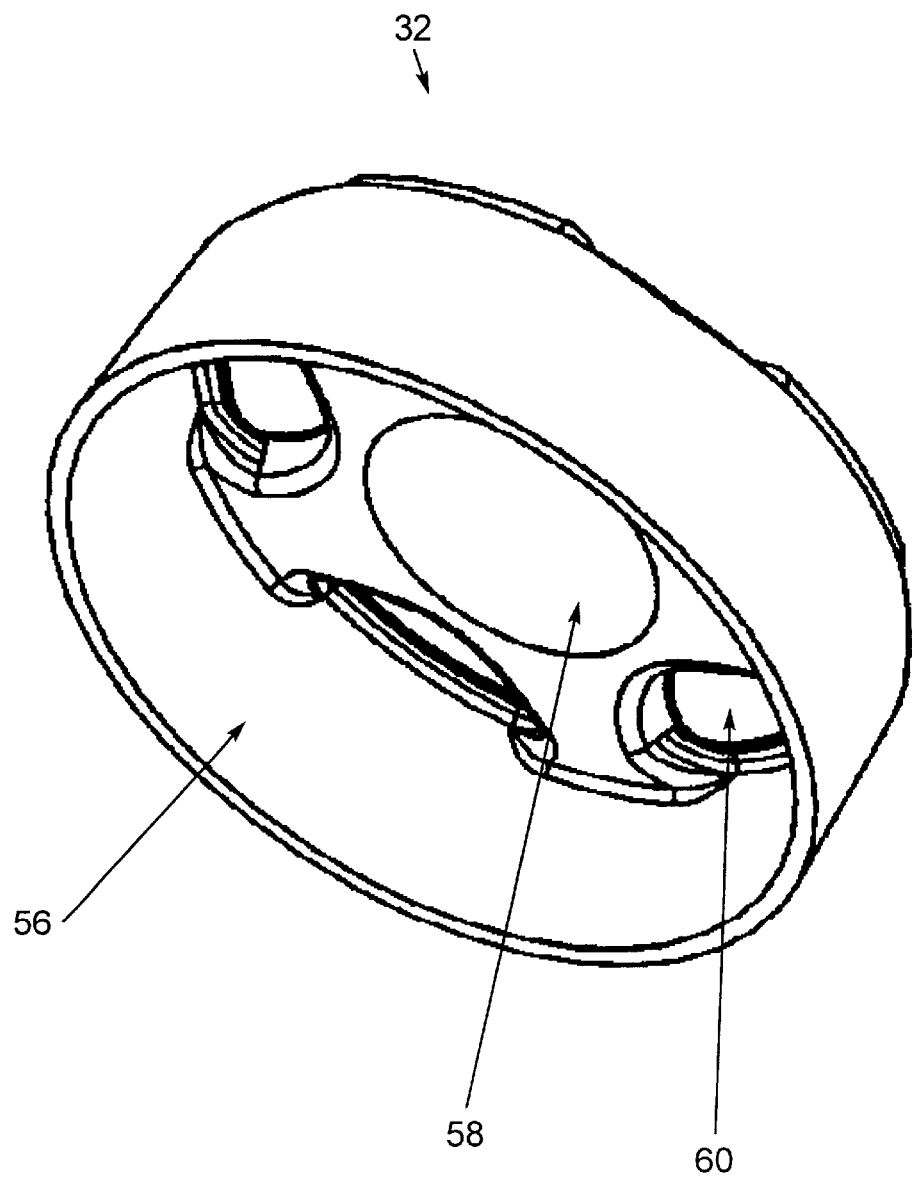
FIG. 10. is a perspective view of the end cap according to the present invention.

An end cap 32 illustrated in FIGS. 2 and 10 is a circular piece that is inserted and secured into the distal end 46 of the lower sleeve 12. The end cap 32 in the present invention is a one-piece design including a centerpiece 58 and a ledge 56, made of molded plastic or similar material. The structural shape and material of the end cap 32 help strengthen and maintain the shape of the lower sleeve 12, improving the durability of the sleeve over the prior art. The end cap 32 is designed such that openings 60 provide ventilation inside the lower sleeve 12. The end cap 32 is light weight and contributes toward the overall light weight of the protective sleeve 10, which is useful for reducing excessive fatigue of the trainer.

A distinct feature of the present invention is the leaf spring 36 depicted in FIGS. 5, 6, 8 and 9. The leaf spring 36 adds reinforcement to the lower sleeve 12, requiring the dog to exert more force when biting the sleeve. The leaf spring 36 generally comprises a layer of plastic, metal, or other material that is bound to the lower sleeve 12 by stitching, adhesive, or other methods. The amount of force necessary for the dog to exert to compress the lower sleeve 12 is controlled by varying the leaf spring 36 properties, such as the shape, size, material, thickness, location and other properties. FIGS. 5, 6, 8 and 9 illustrate several possible configurations for leaf spring 36.

The leaf spring 36 enables a trainer to use a number of different protective sleeves 10 of the present invention, with each having a different leaf spring 36 and thus each requiring a different force from the dog to compress the sleeve. The amount of force required from the dog to compress the sleeve is determined by the configuration of the leaf spring 36, which is internal to the lower sleeve 12, and the dog is therefore unable to determine the strength of the sleeve 10 until the dog exerts force on the sleeve 10. Since the dog cannot visually distinguish the different protective sleeves 10, he cannot anticipate the "feel" of the bite and will not develop the unfavorable habit of always exerting the same amount of force.

The leaf spring 36 provides reinforcement to and helps maintain the shape of the lower sleeve 12 over time. This is an advantage over prior art protective sleeves, which frequently fatigue on the forearm section near the elbow area due to being repeatedly compressed during training.

While the preferred embodiment of the invention has been shown and described herein, it will be apparent to one skilled in the art that various changes, omissions and additions may be made in such embodiment without departing from the spirit and scope of the present invention.

What is claimed is:

1. A protective sleeve comprising
   a sleeve shaped to receive the forearm of the wearer; wherein the shape is substantially cylindrical;
   a one-piece molded handle, generally shaped as a cylinder contoured to accommodate the shape of a human hand wrapped in a fist around said handle; wherein said handle is secured inside a distal end of said sleeve,
   a one-piece molded end cap having a circular shape, having a hub center and spokes extending radially to an outside edge; wherein said end cap is secured inside the distal end of said sleeve;
   at least one leaf spring, is configured in the shape of a portion of said sleeve, that is generally positioned near a proximal end of said sleeve.

2. The protective sleeve according to claim 1, wherein said handle has convex surfaces at both ends extending outward from said cylindrical shape; wherein said convex surfaces has a plurality of holes there through.

3. The protective sleeve according to claim 1, wherein said end cap has a ledge around the outside edge.

4. The protective sleeve according to claim 1, wherein said leaf spring is fastened to an interior surface of said sleeve.

5. The protective sleeve according to claim 1, wherein said leaf spring is laminated between layers of said sleeve.

* * * * *